United States Patent
Stefaniak et al.

(10) Patent No.: US 6,658,448 B1
(45) Date of Patent: Dec. 2, 2003

(54) SYSTEM AND METHOD FOR ASSIGNING PROCESSES TO SPECIFIC CPU'S TO INCREASE SCALABILITY AND PERFORMANCE OF OPERATING SYSTEMS

(75) Inventors: Joseph Peter Stefaniak, San Clemente, CA (US); Philip Douglas Wilson, Lake Forest, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/422,629

(22) Filed: Oct. 21, 1999

(51) Int. Cl.$^7$ .............................. G06F 9/00; G06F 15/00
(52) U.S. Cl. .................. 709/104; 709/102; 709/100; 709/105; 712/1; 712/10; 712/17; 712/224
(58) Field of Search .................. 709/100, 102–105, 709/107–108, 200, 201; 700/1; 712/1, 10, 16, 17, 224

(56) References Cited

U.S. PATENT DOCUMENTS

| | | | | |
|---|---|---|---|---|
| 5,349,656 A | * | 9/1994 | Kaneko et al. | 709/102 |
| 5,768,594 A | * | 6/1998 | Blelloch et al. | 717/149 |
| 6,044,393 A | * | 3/2000 | Donaldson et al. | 709/100 |
| 6,091,414 A | * | 7/2000 | Kraft et al. | 345/807 |
| 6,247,109 B1 | * | 6/2001 | Kleinsorge et al. | 712/13 |
| 6,260,068 B1 | * | 7/2001 | Zalewski et al. | 709/226 |
| 6,298,370 B1 | * | 10/2001 | Tang et al. | 709/102 |
| 6,332,180 B1 | * | 12/2001 | Kauffman et al. | 711/153 |
| 6,433,802 B1 | * | 8/2002 | Ladd | 345/853 |

* cited by examiner

Primary Examiner—Majid A. Banankhah
Assistant Examiner—Syed J Ali
(74) Attorney, Agent, or Firm—Phuong-Quan Hoang; Mark T. Starr; Lisa A. Rode

(57) ABSTRACT

A method in a multi-processor computing system is disclosed. The method is an object-oriented method that allows a user to make associations between processes to be executed and available CPUs of the system. In particular, the method includes the displaying of the associations for a user to manipulate. Responses are accepted by the method from a user for creating logical groupings of the CPUs, hereinafter referred to as affinity groups. Next, an affinity mask is accepted from the user for each of the affinity groups, which affinity mask assigns available ones of the CPUs. After this a determination is made as to whether or not there are more CPUs to be assigned to the affinity groups, and if not; specific rules that make associations between the processes and the affinity groups are then accepted by the method from the user.

15 Claims, 6 Drawing Sheets

SYSTEM AND METHOD FOR ASSIGNING PROCESSES TO SPECIFIC CPU'S TO INCREASE SCALABILITY AND PERFORMANCE OF OPERATING SYSTEMS

FIELD OF THE INVENTION

The present invention generally relates to the field of object-oriented computer programs and in particular to a system and method for increasing the scalability and performance of operating systems.

BACKGROUND OF THE INVENTION

The Windows NT operating system automatically associates tasks to specific CPUs in a multi-processor system. That is, as new tasks are invoked, the Windows NT Operating System will assign the task to a specific processor or group of processors through its internal affinity algorithms with the goal of balancing the CPU utilization equally among all available processors. A discussion of how this is done and definitions of the relevant terms used herein is set forth hereinbelow.

Tasks are logically independent units of work whose use of the computer's central processor(s) can be scheduled. We treat it wholly synonymous with process, the more common term in literature, and use the terms interchangeably herein.

Among other advancements Windows introduced the ability to run more than one application at a time. Although this was considered a multitasking environment, it was labeled non-preemptive multitasking. This means that when an application gains control of the system, it must return control to Windows before any other event can occur. Windows cannot interrupt (preempt) the application to perform other tasks. The heart of the Windows NT operating system is its ability to perform preemptive multi-tasking. This allows the system to schedule sections of the code, and execute them for a fixed period of time, or a time-slice. The sections of code are called threads.

Each Windows NT application has one process and at least one thread. A process is a collection of virtual memory space, code, data, and system resources. When an application starts, a process is created. A process always consists of at least one thread, known as the primary thread. From the primary thread one or more threads can be created. A thread is the unit of code that the NT operating system schedules to be performed. The main difference between a process and a thread is that threads share memory space and system resources. Processes each have there own unique memory space. Moreover, the processor executes only threads, not processes.

As pointed out above, a process can be logically divided into one or more threads, which are taken up for execution by the processor(s). Each thread includes four major sections. First, a section called ThreadProco ( ) contains pointers to the actual location of code that needs to be executed. Second, a machine register saves the state of the thread each time the time-slice for the thread expires. For example, the thread may be interrupted by the system in the middle of the function. The state of the thread is saved by storing the processor registers. The third part of a thread is a stack that stores variables during thread execution and idle time.

The thread is executed as a function of the priority of the process that created the thread and the priority of the thread itself. Once the thread has started, it will execute until it exits, unless the user specifically suspends or terminates the thread. A thread can also become blocked if there is another thread of higher priority waiting to be serviced.

In Windows NT, each process has a priority class attribute. The default class is Normal_Priority_Class. The High_Priroty_Class is reserved for critical tasks that must be performed immediately. The Idle_Priority_Class resutls in the threads of the process being executed only when the system is idle. The Real_Time_Priority_Class pushes all code to the top priority, even equal to some Windows NT system functions. The priority of a process can be set by the SetPriorityClass ( ) function in Windows NT. When a thread is created, Windows NT provides a means to set the base priority, which is Thread_Priority_Normal by default. Like the priority class, the base priority can be changed at any time by calling the SetThreadPriority.

A combination of the priority class of the process and the base priority of the thread determines when and how often the thread executes. The scheduler, which is a part of the Windows NT operating system, is responsible for making these critical decisions that determine which thread gets access to the processor. Today's personal computers are limited by one major factor: they can only perform one instruction at a time. Since we are trying to perform multiple tasks, each task must take its turn. If more than one process is active, their threads will take turns at the microprocessor level. The scheduler tracks all threads and assigns processor time to each. It maintains a queue of all threads running on the system. Thus, it is the scheduler that plays a central role in assigning threads to a processor on the basis of a thread's base priority along with the priority of the process to which it belongs.

In a system having multiple central processors, scheduling assumes the form of a problem having the following aspects. First, sharing of resources should be balanced so that none of the central processing units gets over-utilized or under-utilized. Second, it should be ensured that no two central processors are assigned to the same task simultaneously. Third, if one of the central processors malfunctions, the tasks running on it should be scheduled to run on alternative available central processors in accordance with their assigned priorities. Finally, the scheduler should be able to dedicate processor resources to the most critical tasks on a permanent basis.

Although the Windows NT operating system provides some or all of the above capabilities, in prior art there are no methods available to view all task/processor associations in the system. This implies that there is no way to view one or more tasks as objects that could be assigned to execute on another object representing one or more of the multiple central processing units in the system.

Another problem with prior art is that there are no methods available to associate objects representing processors to another object representing a group of processors.

Still another problem with prior art is that there is no method available to define an object representing a rule that could allow users to influence the scheduling algorithm of the operating system so that users could periodically vary the tasks associated with a processor, or a group of processors, based on the changing needs of the environment in which such a system operates.

SUMMARY OF THE INVENTION

This invention provides NT administrators with a system and method for controlling the assignment of tasks to specific CPUs using both scripting languages and a user-interface that facilitates the definition, modification, and association of processor groups and rules.

An object of this invention is to provide both a user-interface and an application programming interface that give system administrators the ability to associate NT operating system tasks with specific processor groups, which are in turn associated with specific CPUs.

Another objective of this invention is to provide a centralized view of all tasks running on the system associated with specific groupings of CPUs.

Still another objective of this invention is to provide system administrators with the ability to define rules that permit the automatic association of tasks to processor groups.

A feature of the present invention is the ability to automatically change an affinity mask assigned to a process in response to a change in the makeup of an affinity group.

These and other objects, which will become apparent as the invention is described in detail below, wherein a method in a multi-processor computing system is disclosed. The method is an object-oriented method that allows a user to make associations between processes to be executed and available CPUs of the system. In particular, the method includes the displaying of the associations for a user to manipulate. Responses are accepted by the method from a user for creating logical groupings of the CPUs, hereinafter referred to as affinity groups. Next, an affinity mask is accepted from the user for each of the affinity groups, which affinity mask assigns available ones of the CPUs. After this a determination is made as to whether or not there are more CPUs to be assigned to the affinity groups, and if not; specific rules that make associations between the processes and the affinity groups are then accepted by the method from the user.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
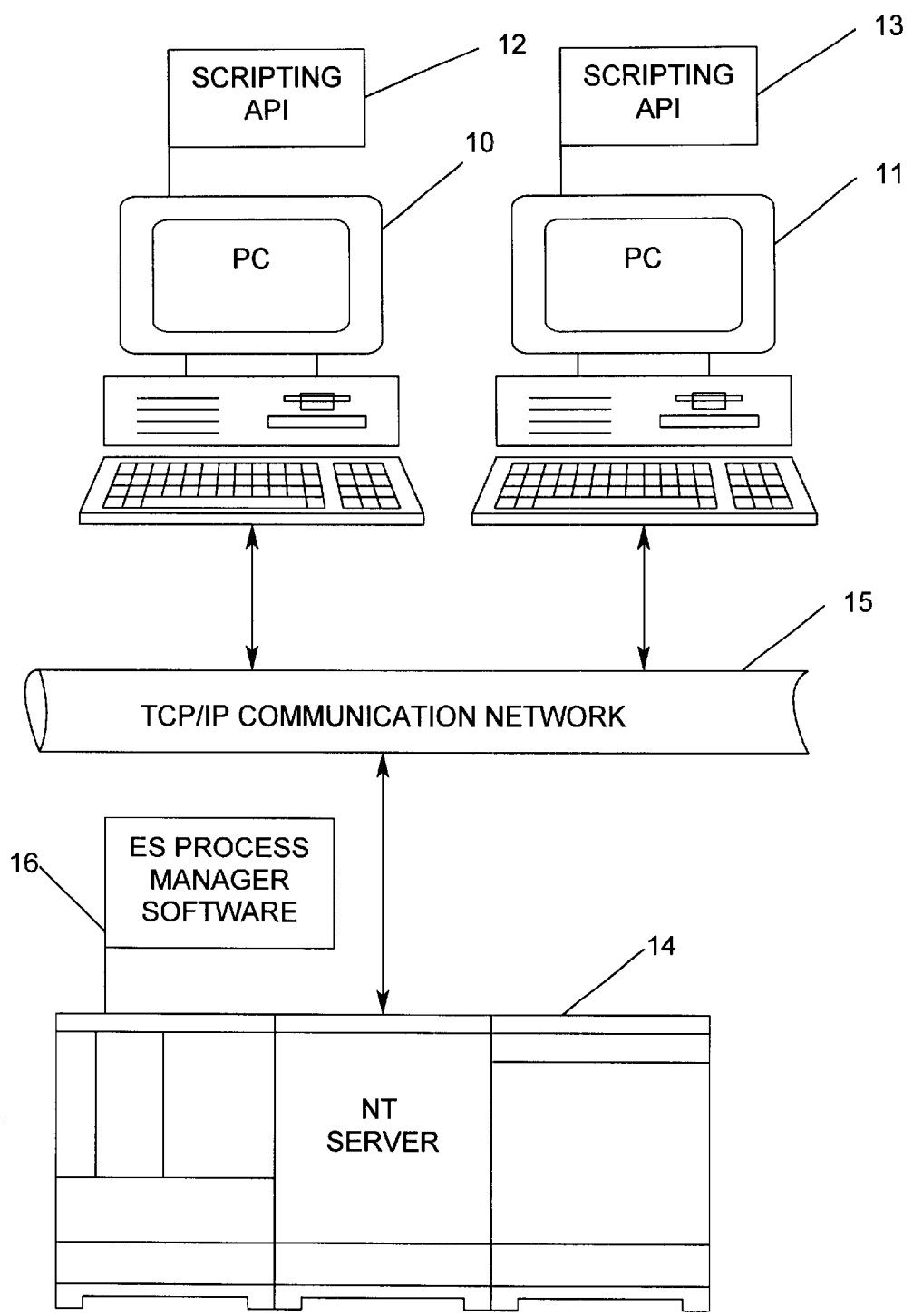
FIG. 1 is a block diagram of a computer system useful in implementing the system and method of the present invention.

Referring now to the drawings and FIG. 1 in particular, a computer system capable of executing the method of the present invention is shown. PCs 10 and 11 run script software 12 and 13, respectively, which is an Application Program Interface (API) to other software. The PCs 10 and 11 are coupled to an NT server 14 by means of a TCP/IP network 15. The API can be scripted to allow users to control and manipulate the functionality of a Process Manager Application software 16.

Figure 2:
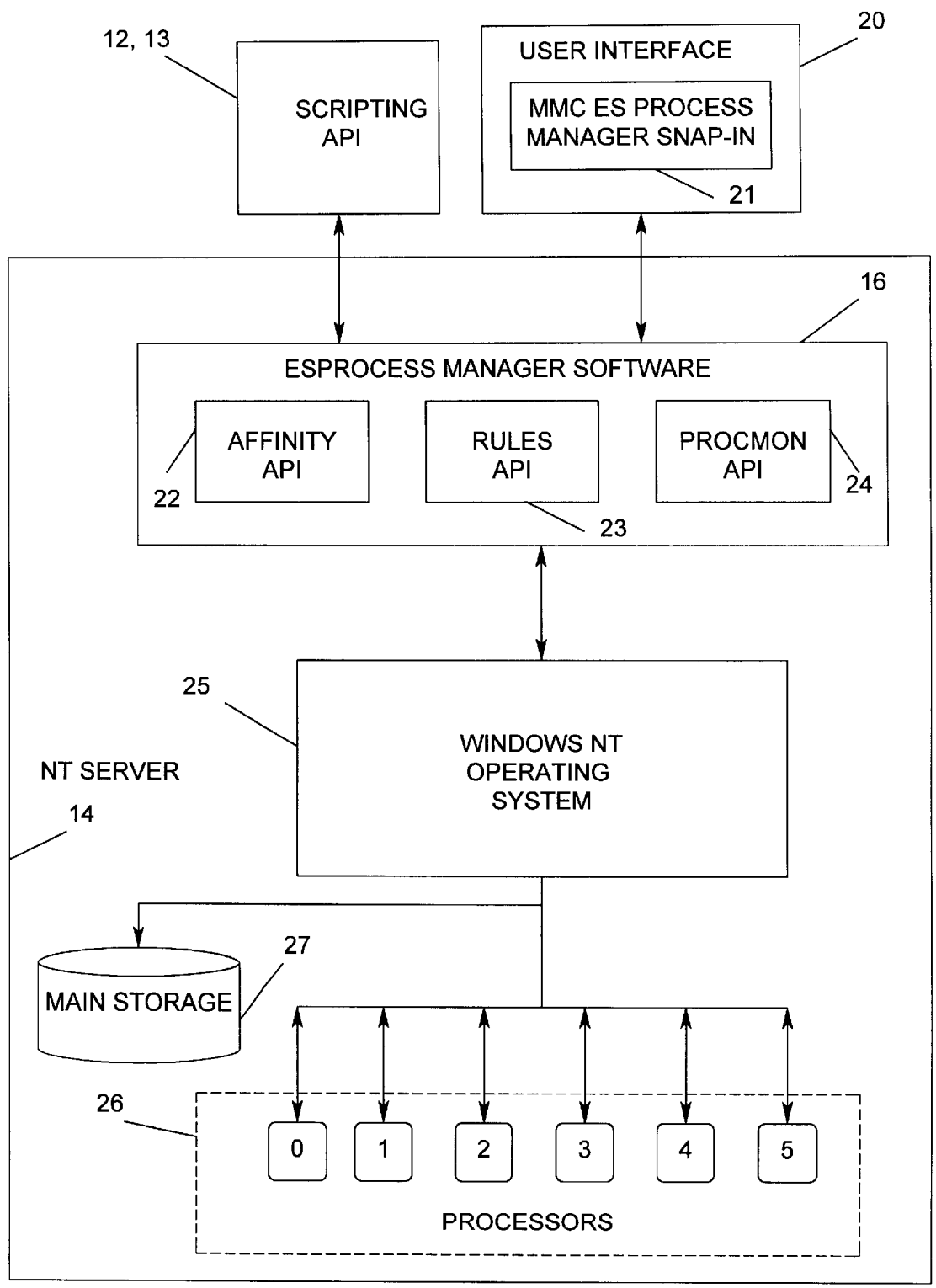
FIG. 2 is a modular block diagram of the system and method of the present invention.

Referring now to FIG. 2, a modular diagram representing the system and method of the present invention is shown. The Windows NT server 14 of FIG. 1 is shown herein to include the ESProcess Manager software 16, the Windows NT Operating System 25, the multiprocessor system 26, and the shared main storage 27. The scripting API 12 or 13, or an MMC Process Manager snap-in 21, which is available from Microsoft Corporation of Redmond, Wash., may be used to access the Process Manager Software 16. The Process Manager software 16 includes an Affinity API module 22, a Rules API module 23, and a Procmon API module 24. The Process Manager software 16 runs on a Windows NT operating system 25.

The modules within the Process Manager Software together provide the functionality needed to control the association of processor groups and tasks according to rules defined by the process manager software 16 running on the Windows NT. Specifically, the Affinity API module 22 is responsible for the functionality to define an object called an Affinity Group that represents a logical grouping of one or more central processing units. The grouping is an abstraction of the processing resources into well defined groups so that specific processes may be assigned to run on them. Groups can be defined on the basis of the user's needs for abstraction of the processors.

Figure 4:
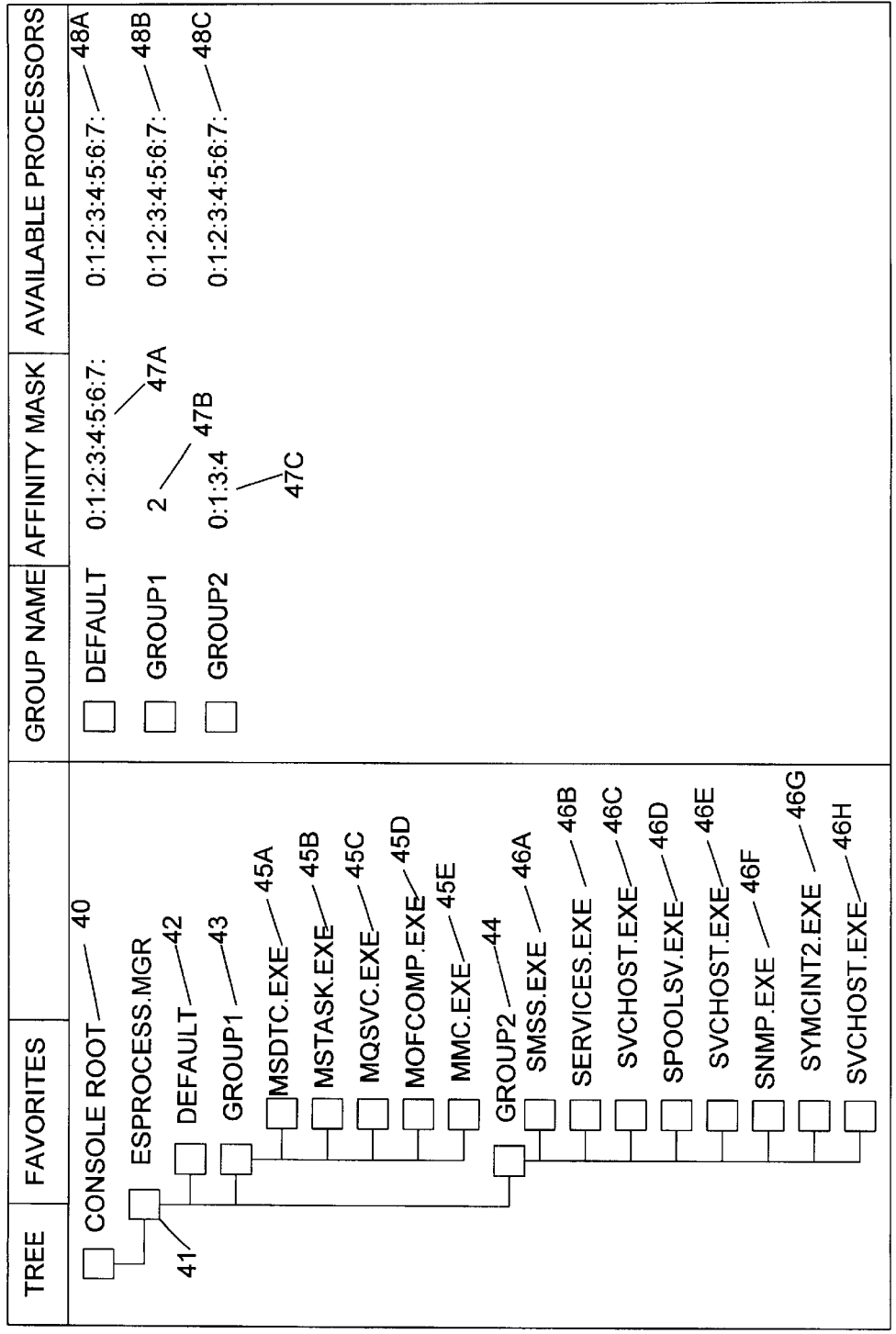
FIG. 4 is a screen shot of an implementation of the user interface of the present invention.

The definition of an Affinity Group can take the form of an Affinity Mask, an example of which is shown in FIG. 4. An Affinity Mask basically contains the numbers of all the processors in the affinity group, separated by colons. Using the esProcess Manager Software 16, an Affinity Mask can be assigned to each process as it is initiated for execution in the NT operating system based on rules that can be specified using the Rules API module, which will be discussed later. In the prior art the Affinity Mask took the form of a default affinity mask, which was always assigned to each and every process that was initiated for execution. The Default Affinity mask directed the NT scheduler to assign the process to any one of the processors that was available at the time that process was taken up for execution.

The concept of creating a Default Affinity mask is retained in the present invention by creating an affinity group called Default Affinity Group containing all the processors on the system as soon as the esProcess Manager software 16 is installed on the system. However, a contribution of this invention is to provide the creation of Rules so that a different Affinity Mask can be assigned to a Process when it is initiated. Thus, when the process is taken up for execution, the Scheduler Algorithm can assign that process to any one of those processors based on its Affinity Mask. This implies that if the Rules caused a different Affinity mask than the Default to be assigned to a process, then the process could only be assigned to one of the processors specified by its own Affinity Mask. If no rule has been defined for a process then it is assigned to the Default Affinity Group.

Further, the Rules API module 23 provides the user with the functionality to define objects called Rules that associate specific tasks to specific Affinity Group objects. An example of a rule could be that all processes beginning with the letter "w" be associated with Affinity Group "X". Defining a rule this way assigns the Affinity Mask for the Affinity Group "X" to the process when it is initiated in the Operating System. In this way, any process can be associated for execution with any Affinity Group defined by the Affinity API module discussed hereinabove.

Similarly, the Procmon API module 24 provides users an integrated view of all the tasks running on the computer system and their associated affinity group objects. It also allows the user to view the rule objects that associate specific tasks to specific affinity group objects.

Figure 3:
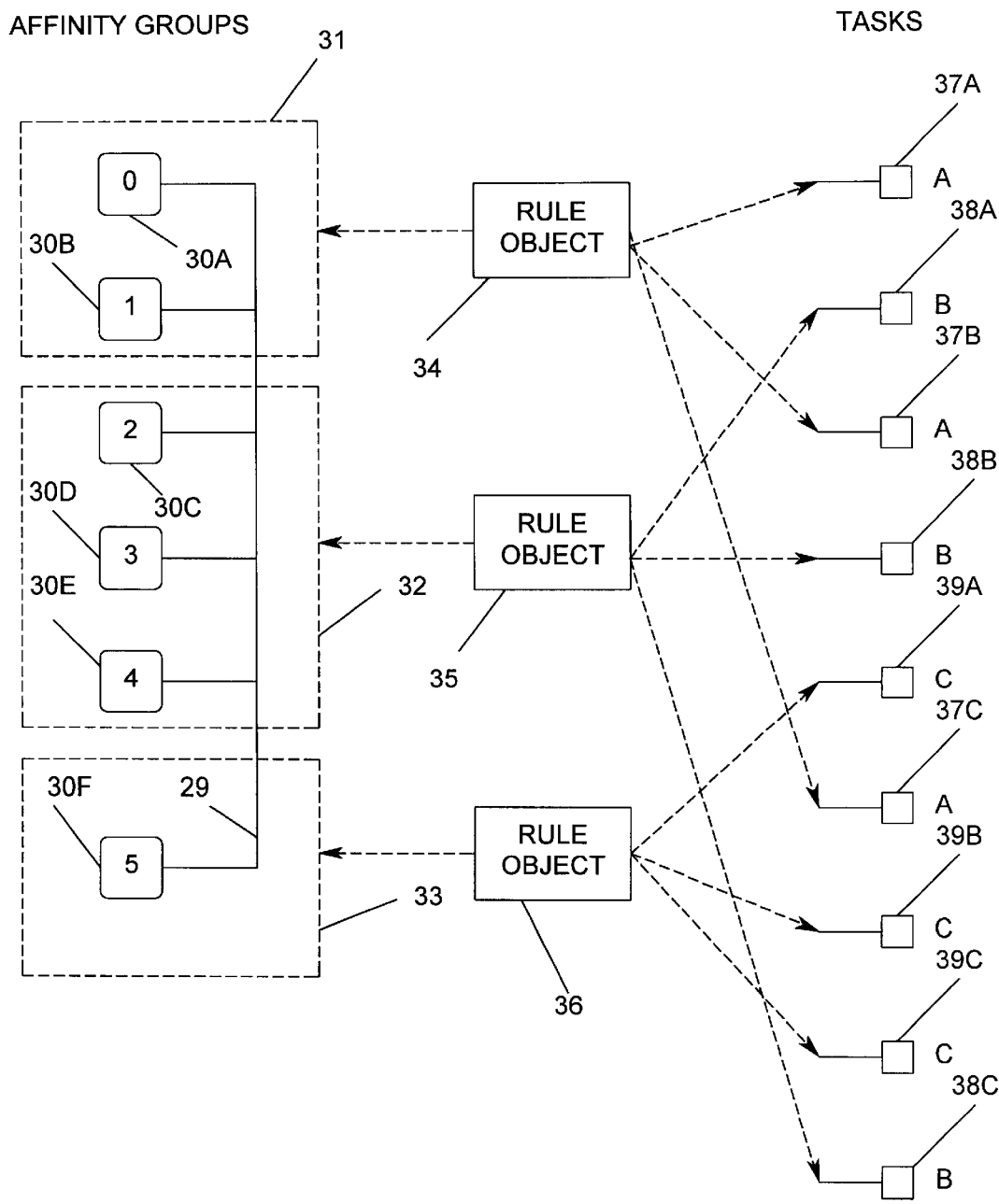
FIG. 3 is a functional diagram illustrating the association of tasks to affinity group objects using rule objects.

Referring to FIG. 3, a functional diagram illustrating the association of tasks to affinity group objects using rule objects defined by the Process Manager Software 16 is shown. Processors 30A through 30F are the hardware resources (i.e., CPUs) of the server 14, which are used to execute all tasks being processed by the server. For the purposes of our discussion, the multiprocessor system considered in FIG. 3 is a homogeneous multiprocessor system where all the processors are placed on a shared bus 29 and they share a common main storage 27 (shown in FIG. 2). However, the invention disclosed herein is entirely applicable to multiprocessor systems of different configurations than the one depicted in FIG. 3 of this patent application.

The processors (or CPUs) 30A through 30F may be grouped into logical units called affinity groups using the Process Manager software 16. These affinity group objects are shown by the broken rectangles 31, 32 and 33, each of which logically groups one or more processors. Grouping is selected by the users based on an assessment of the individual workload and utilization levels of the processors.

There are three rule objects 34, 35 and 36 shown in FIG. 3. Rule objects define the conditions that associate a task to a specific affinity group. Broken arrows indicate the associations that rule objects make between tasks and affinity group objects. Three sets of tasks are illustrated as an example of the multiplicity of tasks that can be associated to processor groups for execution. Set 37A through 37C is associated by rule object 34 to affinity group object 31. Similarly, the set of tasks 38A through 38C is associated by rule object 35 to affinity group object 32. The set of tasks 39A through 39C is associated by rule object 36 to affinity group object 33.

Referring now to FIG. 4, a screen shot of an implementation of the MMC ES process manager snap-in 21 of the esProcess Manager software 16 is shown. The console root 40 is shown to contain the esProcess Manager tree 41. The grouping of processors into affinity group objects is shown in a tree structure under the esProcess Manager tree 41. Three affinity group objects are illustrated as: Default object 42, Group1 object 43, and Group2 object 44. The Affinity Group object 43 is shown to be associated with tasks 45A through 45E. Similarly, tasks 46A through 46H are shown as associated to Affinity Group Object 44. Using the Procmon API module 24 of the esProcess Manager software 16, rules can be modified to change the Affinity Group object and task object associations. On the right-hand part of the drawing is shown the affinity masks 47A, 47B, and 47 C for the Affinity Group Objects 42, 43 and 44, respectively. An affinity mask defines which processors are assigned to a specific affinity group. For example the Default Affinity Group object 42 has processors 0 through 7 assigned to it while the affinity group object Group1 43 has processor 2 assigned to it. A user of the esProcess manager software 16 can change the processor assignments to affinity groups by changing the Affinity masks shown in FIG. 4. The block labeled Available Processors in FIG. 4 indicates the processors available in the system to be assigned to Affinity Group objects. Thus, all 8 processors shown in 48A through 48C are available to be assigned to Affinity Group objects 42, 43, and 44.

Figure 5:
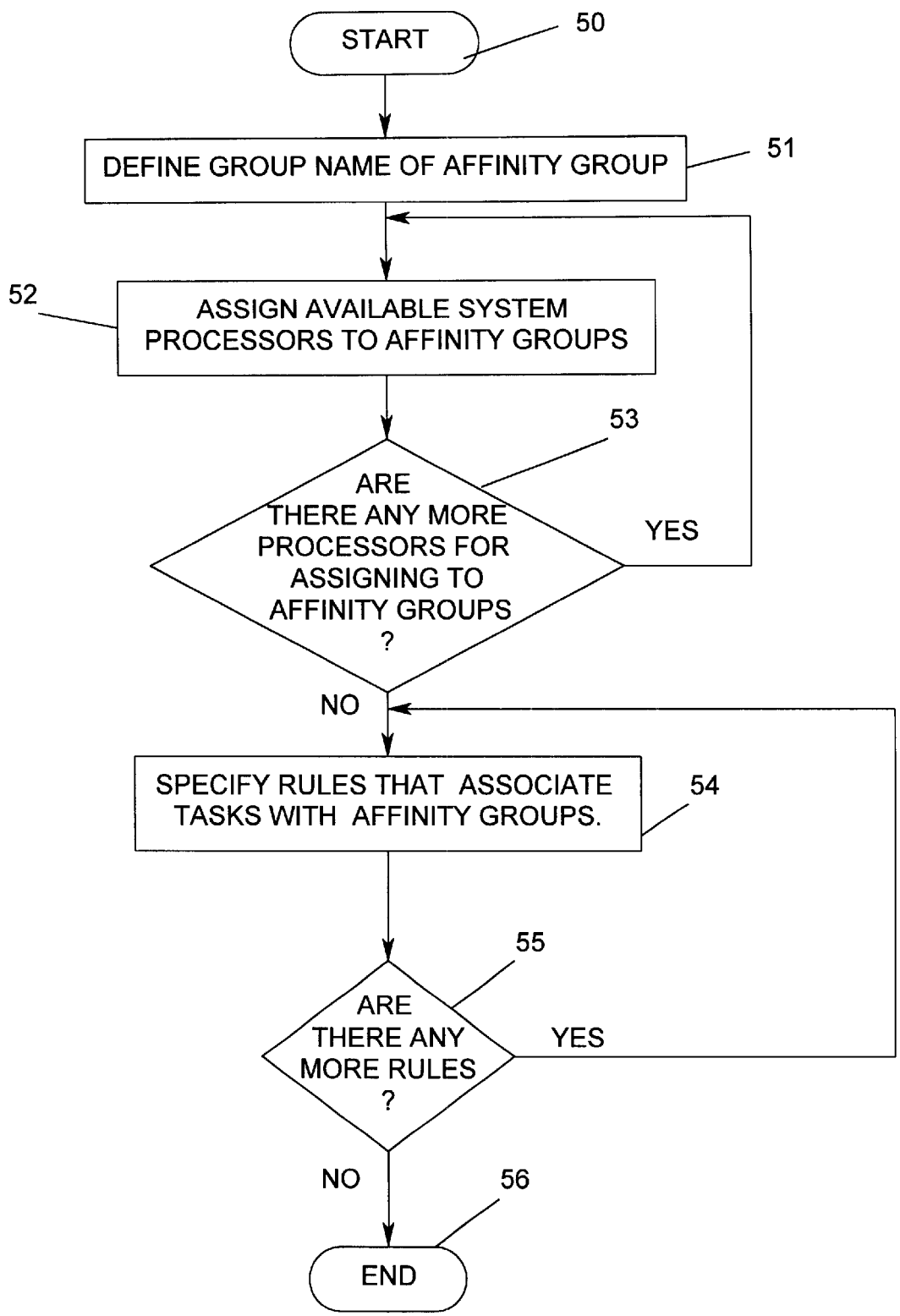
FIG. 5 is a flowchart of the process of defining affinity group names and associating tasks to the affinity groups based on rules.

Referring now to FIG. 5, a flow chart of the process of defining affinity group names and associating tasks to the affinity groups based on rules is illustrated. The process begins with a start bubble 50 followed by a step of defining the group name of an affinity group (block 51). Next, available system processors are assigned to the affinity group (block 52) in order to logically group the processors under the name of the affinity group defined in the previous step. Following this, an inquiry is made as to whether or not there are any more processors for assigning to the affinity group (diamond 53). If the answer to this inquiry is yes then the next processor is assigned to the affinity group. On the other hand if the answer to this inquiry is no, then rules are specified that associate specific tasks with affinity groups (block 54). Following this an inquiry is made as to whether or not there are any more rules (diamond 55). If the answer to this inquiry is yes then the next rule is specified that associates tasks with affinity groups (block 54). On the other hand if the answer to this inquiry is no, then the process ends (bubble 56).

Figure 6:
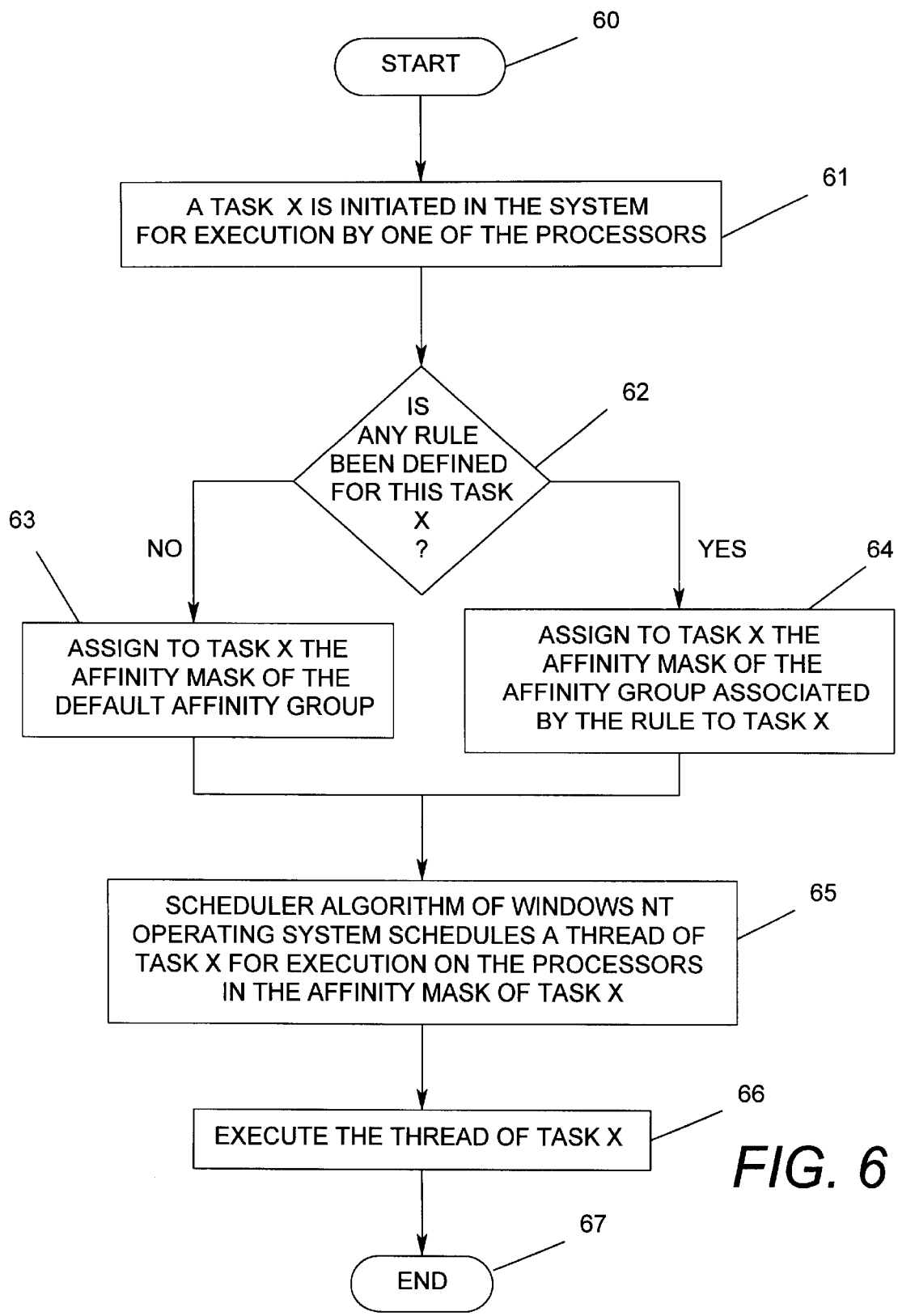
FIG. 6 is a flowchart of the run-time process of the present invention.

Referring now to FIG. 6, a flowchart of the run time process of the present invention is shown. The process begins with a start bubble 60 followed by a step of initiating a task X in the system for execution by one of the processors (block 61). Next, an inquiry is made as to whether or not any rule has been defined for the task X initiated in the previous step (diamond 62). If the answer to this inquiry is no then the affinity mask of the default affinity group is assigned to task X (block 63). On the other hand, if the answer to this inquiry is yes, then the affinity mask of the affinity group associated by the rule to task X is assigned to task X (block 64). The steps in blocks 63 and 64 are followed by a common step wherein a thread of task X is scheduled for execution on the processors in the affinity mask of task X by the scheduler algorithm of the Windows NT operating system (block 65). This is true because in the Windows NT operating system, a thread belonging to a task inherits the affinity mask of that task and the scheduler schedules such a thread for execution on the processors in the inherited affinity mask. Next, the thread of task X from the previous step is executed by one of the processors in the affinity mask of task X (block 66). The process then ends in the end bubble 67.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a multi-processor system the combination comprising:
   an operating system;
   a plurality of CPUs coupled to said operating system for performing processes initiated thereby;
   a user interface including a GUI for displaying associations between said CPUs and said processes;
   a process manager coupled to said user interface and said operating system for creating associations of processes and CPUs in response to inputs from said user interface;
   said process manager including an affinity module responsive to said user interface for defining logical groupings of said CPUs, hereinafter affinity groups, and for also providing an associated affinity mask for each affinity group indicating the one or more CPUs included in its respective group;
   said process manager also including a rules module responsive to said user interface for providing user-changeable processor-association rules for assigning infinity groups to processes such that, when a process is initiated during operation of said system, a selected affinity mask will automatically be assigned to the process so as to cause execution of the process by CPUs in the affinity group associated with the selected affinity mask, said rules also providing that no two CPUs will be assigned to the same process simultaneously.

2. The combination of claim 1, wherein said process manager includes a procmon module for displaying on said GUI a view of all of the processes running on the system and their associated affinity groups, and for also displaying the rules that associate specific processes to specific affinity groups.

3. The combination of claim 1, wherein said procmon module displays on said GUI a list of the one or more CPUs assigned to each affinity group, and wherein a user, via said user interface, can change the listing of CPUs in each affinity group by changing the listing of CPUs displayed for that affinity group.

4. The combination of claim 1, wherein said affinity groups and said rules are provided as objects so as to be usable for object-oriented programming.

5. The combination of claim 1, wherein said affinity module, said rules module and said procmon module are each provided as an API.

6. The combination of claim 1, wherein a process comprises a plurality of threads, each thread inheriting the affinity mask of its process when the thread is scheduled for execution.

7. The combination of claim 1, wherein said affinity module provides a default affinity group and a corresponding default affinity mask.

8. The combination of claim 7, wherein said process manager assigns the default affinity mask to an initiated process if the process has no assigned affinity mask.

9. In a multi-processor computing system having a plurality of CPUs, an object-oriented method for allowing a user to make associations between processes to be executed and available CPUs of said system, said method comprising;
   providing a user interface coupled to a process manager of said system for controlling the associations of CPUs and processes according to specified rules, said controlling including the capability of changing said associations;
   displaying said associations via a GUI of said user interface;
   in response to inputs from a user, defining user-changeable groupings of said CPUs, hereinafter affinity groups, each affinity group having an associated affinity mask indicating the one or more CPUs included in its respective affinity group;
   in response to inputs from said user, providing user-changeable process-association rules for assigning affinity groups to processes for execution thereof such that, when a process is initiated during operation of said system, a rule-selected affinity mask will automatically be assigned to the process so as to cause execution of the process by CPUs in the affinity group associated with the rule-selected affinity mask, said rules also providing that no two CPUs will be assigned to the same process simultaneously.

10. The method of claim 9, wherein said displaying includes displaying on a monitor of said GUI a list of the one or more CPUs assigned to each affinity group, and also the processes assigned to each affinity group, and wherein a user can change the listing of CPUs in a affinity group by changing the CPUs displayed in the list for that affinity group.

11. The method of claim 10, wherein said displaying includes displaying the processes assigned to each affinity group.

12. The method of claim 9 including automatically changing an affinity mask assigned to a process in response to a change in the makeup of its respective affinity group.

13. The method of claim 9 including creating a default affinity group and a corresponding default affinity mask.

14. The method of claim 13, including assigning the default affinity mask to an initiated process if the process has no assigned affinity mask.

15. The method of claim 9, wherein said affinity groups and said rules are provided as objects so as to be usable for object-oriented programming.

* * * * *